United States Patent
Tardy-Tuch

(10) Patent No.: US 11,511,799 B2
(45) Date of Patent: Nov. 29, 2022

(54) METHOD FOR FRICTION COEFFICIENT DETERMINATION AND FRICTION COEFFICIENT DETERMINATION APPARATUS ON ELASTICALLY CONNECTED SUBSYSTEMS

(71) Applicant: Dr. Ing. h.c. F. Porsche Aktiengesellschaft, Stuttgart (DE)

(72) Inventor: Georg Tardy-Tuch, Unterreichenbach-Kapfenhardt (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 433 days.

(21) Appl. No.: 16/825,013

(22) Filed: Mar. 20, 2020

(65) Prior Publication Data
US 2020/0317263 A1   Oct. 8, 2020

(30) Foreign Application Priority Data

Apr. 5, 2019   (DE) ..................... 10 2019 108 970.0

(51) Int. Cl.
*B62D 7/22* (2006.01)
*G07C 5/08* (2006.01)
(Continued)

(52) U.S. Cl.
CPC ............. *B62D 7/22* (2013.01); *B62D 1/04* (2013.01); *B62D 1/20* (2013.01); *G01N 19/02* (2013.01);
(Continued)

(58) Field of Classification Search
CPC ... B62D 7/22; B62D 1/04; B62D 1/20; G01N 19/02; G07C 5/0808
(Continued)

(56) References Cited

U.S. PATENT DOCUMENTS 6,880,386 B1 * 4/2005 Krotil .................... G01N 19/02
73/105
10,106,190 B2   10/2018 Bremkens et al.
(Continued)

FOREIGN PATENT DOCUMENTS

DE        19900114 A1   8/2000
DE    102004016288 B3   8/2005
(Continued)

*Primary Examiner* — Peter D Nolan
*Assistant Examiner* — Luke Huynh
(74) *Attorney, Agent, or Firm* — RatnerPrestia

(57) ABSTRACT

A method for friction coefficient determination on elastically connected subsystems, in which an overall system includes multiple subsystems and at least two subsystems are connected to one another by an elastic connection. The elastic connection has at least one static friction state and a sliding friction state for prescribed external state variables, in which the overall system is excited with a vibration having a variable excitation amplitude at a defined excitation frequency. The excitation amplitude is varied, in which a phase difference between the vibration and a measured reaction torque together with the excitation amplitude are recorded as a function of time, in which no phase difference occurs in the static friction state and a phase difference of 180° occurs in the sliding friction state. In a first step, the excitation amplitude is increased until a transition in the phase difference from 0° to 180° indicates the transition from the static friction state to the sliding friction state.

12 Claims, 3 Drawing Sheets

(51) Int. Cl.
  *B62D 1/20*    (2006.01)
  *B62D 1/04*    (2006.01)
  *G01N 19/02*   (2006.01)
  *B62D 5/04*    (2006.01)

(52) U.S. Cl.
  CPC .......... *G07C 5/0808* (2013.01); *B62D 5/0481* (2013.01)

(58) Field of Classification Search
  USPC .......................................................... 73/649
  See application file for complete search history.

(56) References Cited

U.S. PATENT DOCUMENTS

| | | | |
|---|---|---|---|
| 11,016,002 B2 * | 5/2021 | Wheeler | G01M 17/007 |
| 2007/0050121 A1 | 3/2007 | Ammon et al. | |
| 2015/0143913 A1 * | 5/2015 | Adams | G06V 20/52 |
| | | | 382/104 |

FOREIGN PATENT DOCUMENTS

| | | |
|---|---|---|
| DE | 102008021848 A1 | 11/2009 |
| DE | 102009057166 A1 | 6/2011 |
| DE | 102011102453 A1 | 5/2012 |
| DE | 102013008943 A1 | 11/2014 |
| DE | 102018103359 A1 | 8/2018 |

\* cited by examiner

METHOD FOR FRICTION COEFFICIENT DETERMINATION AND FRICTION COEFFICIENT DETERMINATION APPARATUS ON ELASTICALLY CONNECTED SUBSYSTEMS

CROSS-REFERENCE TO RELATED APPLICATION

This application claims priority to German Patent Application No. 10 2019 108 970.0, filed Apr. 5, 2019, the content of such application being incorporated by reference herein in its entirety.

FIELD OF THE INVENTION

The present invention relates to a method for friction coefficient determination on elastically connected subsystems. Further, a friction coefficient determination apparatus on elastically connected subsystems of this kind is claimed. Elastically intercoupled subsystems, such as for example those in a steering system, form an overall system, the characteristic parameters of which experience a change according to external influence. Such changes are used in the prior art to monitor a driving behavior of a car, for example.

BACKGROUND OF THE INVENTION

As such, the document DE 10 2004 016 288 B3, which is incorporated by reference herein in its entirety, discloses a method for determining a friction coefficient in which an amplitude of a tire vibration is evaluated. This is used to infer a friction coefficient between tire and road.

The document DE 10 2013 008 943 A1, which is incorporated by reference herein in its entirety, monitors an operating variable on the steering system in order to establish whether a vehicle is on a slippery road surface. The operating variable cited is, inter alia, an engine angle or a torque transferred to a torque rod of the steering system.

For some driver assistance functions relating to the steering of a vehicle, the legislator requires contact with the steering wheel by a driver to be monitored. The contact with the steering wheel, or interruption thereof, also referred to as "hands-on" and "hands-off", can be detected for example by means of a direct sensor system on the steering wheel or the steering system, with the sensor system giving rise to additional costs, however. Indirect measurement for example using the aforementioned characteristic parameters—of the steering system in the present case—therefore appears advantageous. One problem with this is that detection of one of the two states "hands-on" and "hands-off" normally has a high level of system friction superimposed on it. Methods known in this regard observe a movement behavior of a subsystem and detect a respective friction state, possibly by using an appropriate filter. In essence, an amplitude value for a selected parameter pertaining to the movement behavior is used as a quantitative variable for the observation.

As such, the document DE 10 2011 102 453 B4, which is incorporated by reference herein in its entirety, involves a respective wheel steering force before and after a wheel steering speed flips over being determined in a steering system at separate times in order to determine a frictional force amplitude from a difference between the two wheel steering forces. If the frictional force amplitude is known, it can be used to actuate a power steering in suitable fashion, so that an awareness of frictional forces is better eliminated.

Accurate knowledge of the respective friction states—for example on the basis of aging and/or temperature—is thus necessary in order to be able to make a reliable distinction between these friction states.

Against this background, it would be desirable to provide a method that allows the determination of friction coefficients for characterizing friction states on elastically connected subsystems. Further, the aim is to present an apparatus for determining the friction coefficients on elastically connected subsystems of this kind.

In view of the foregoing, described herein is a method for friction coefficient determination on elastically connected subsystems in which an overall system comprises multiple subsystems and at least two subsystems are connected to one another by an elastic connection. The elastic connection has at least one static friction state and a sliding friction state for prescribed external state variables. The overall system is excited with a vibration having a variable excitation amplitude at a defined excitation frequency, wherein the excitation amplitude is varied slowly, that is to say without producing nonlinearities in a system response. A phase difference between the vibration and a measured reaction torque is recorded together with the excitation amplitude as a function of time, wherein no phase difference occurs in the static friction state and a phase difference of 180° occurs in the sliding friction state. In a first step, beginning with a value of the excitation amplitude at which the elastic connection is still in a static friction state, the excitation amplitude is increased until a transition in the phase difference from 0° to 180° indicates the transition from the static friction state to the sliding friction state. The excitation amplitude present for this transition stipulates a static friction coefficient or a static friction level. In a second step, the excitation amplitude is reduced again until a transition in the phase difference from 180° to 0° indicates the transition from the sliding friction state to the static friction state. The excitation amplitude present for this transition stipulates a sliding friction coefficient or a sliding friction level.

SUMMARY OF THE INVENTION

The method according to aspects of the invention advantageously makes use of the fact that, in response to the exciting vibration, the observable measured variables available, without significant delays, in the overall system to be observed in which the friction coefficient determination is supposed to take place are also just phase, amplitude and reaction torque.

In one embodiment of the method according to aspects of the invention, the defined excitation frequency is determined by virtue of the overall system being excited with a vibration having a smaller first test amplitude and a larger second test amplitude (test vibration). A test frequency of the vibration is varied from a lower frequency limit to an upper frequency limit, wherein the elastic connection is still in a static friction state for all prescribed external state variables during the vibration at the lower frequency limit and the elastic connection is in a sliding friction state for all prescribed external state variables during the vibration at the upper frequency limit. In a first test step, the vibration has the smaller first test amplitude, which is chosen to be sufficiently large to transfer the elastic connection to the sliding friction state between the lower and upper frequency limits, however. A transition takes place between the static friction state and the sliding friction state in a first transition region around a first natural system frequency. In a second test step, the vibration has the larger second test amplitude.

The transition takes place between the static friction state and the sliding friction state in a second transition region around a second natural system frequency. The first test amplitude and the second test amplitude are chosen such that the two transition regions do not overlap. Finally, the defined excitation frequency is chosen from a frequency range between the two transition regions.

In a further embodiment of the method according to aspects of the invention, the external state variables are selected from the following list: temperature, age, wear, service interval. The external state variables influence for example a rigidity of the elastic connection and thus alter a natural system frequency. The method according to aspects of the invention should thus be carried out for constant external state variables. It is conceivable to vary a setting of the external state variables, and to determine the friction coefficients for a respective setting. For example the external state variable temperature can be varied e.g. in a temperature range typical of operation of the overall system. The respectively determined friction coefficients are then stored retrievably in a table together with the respective settings of the external state variables.

In yet another embodiment of the method according to aspects of the invention, the overall system is formed from the subsystems steering wheel, steering column and torque rod. The method according to aspects of the invention can generally be used on vibrating systems for friction coefficient determination. In the case of a steering system, the inventive determination of the static friction coefficient and the sliding friction coefficient is advantageous for further characterization of a behavior of the steering system in the face of changes to the subsystems, for example as a result of contact with the steering wheel by a driver of a car or of a vehicle. An associated change of mass alters the natural system frequency, which—given constant external state variables—is determined solely by a mass of the subsystems and a rigidity of the elastic connection. Knowledge of the static friction coefficients, possibly from access to the aforementioned table for varied external state variables, advantageously allows a detection in consideration of a friction behavior, which, depending on the situation with the natural system frequency, can change between static friction and sliding friction, and the detection can then detect transitions between static friction state and sliding friction state. More advantageously, such transitions between static friction and sliding friction on the basis of excitations by vibrations in a steering system take place at sufficiently small amplitudes, which means that a detection geared thereto can remain below an awareness threshold of the driver.

In a further embodiment of the method according to aspects of the invention, the vibration excites the overall system in direct proximity to the steering wheel and the steering column.

In yet a further embodiment of the method according to aspects of the invention, the reaction torque on the torque rod is measured by a sensor.

In addition, a friction coefficient determination apparatus for friction coefficient determination on elastically connected subsystems is claimed, which has an overall system having multiple subsystems, wherein at least two subsystems are connected to one another by an elastic connection. The friction coefficient determination apparatus further has a vibration generator configured to excite the subsystems with a vibration. Further still, the friction coefficient determination apparatus on the overall system has a sensor configured to detect a reaction torque of the overall system. Finally, the friction coefficient determination apparatus further comprises means designed to record a phase difference between the vibration and the measured reaction torque together with the excitation amplitude as a function of time. The friction coefficient determination apparatus is configured so as, in a first step, beginning with a value of the excitation amplitude at which the elastic connection is still in a static friction state, to increase the excitation amplitude until a transition in the phase difference from 0° to 180° indicates transition from the static friction state to the sliding friction state. The excitation amplitude present for this transition stipulates a static friction coefficient. Finally, the friction coefficient determination apparatus is configured so as, in a second step, to reduce the excitation amplitude again until a transition in the phase difference from 180° to 0° indicates the transition from the sliding friction state to the static friction state. The excitation amplitude present for this transition stipulates a sliding friction coefficient.

In one configuration of the friction coefficient determination apparatus, it comprises additional means designed to record the phase difference as a function of a test frequency. The friction coefficient determination apparatus is configured to determine the defined excitation frequency by virtue of the overall system being excited with a vibration having a smaller first test amplitude and a larger second test amplitude (test vibration), and a test frequency of the vibration being varied from a lower frequency limit to an upper frequency limit. The elastic connection is still in a static friction state for all prescribed external state variables during a vibration at the lower frequency limit. Additionally, the elastic connection is in a sliding friction state for all prescribed external state variables during a vibration at an upper frequency limit. Further, the friction coefficient determination apparatus is configured to determine the defined excitation frequency by virtue of, in a first test step, the vibration having the smaller first test amplitude, which is sufficiently large to transfer the elastic connection to the sliding friction state between the lower and upper frequency limits, being used to produce a transition between the static friction state and the sliding friction state in a first transition region around a first natural system frequency, and by virtue of, in a second test step, the vibration having the larger second test amplitude being used to produce a transition between the static friction state and the sliding friction state in a second transition region around a second natural system frequency, wherein the first test amplitude and the second test amplitude are chosen such that the two transition regions do not overlap, and by virtue of the defined excitation frequency being in a frequency range between the two transition regions.

In a further configuration of the friction coefficient determination apparatus, the overall system is formed from the subsystems steering wheel, steering column and torque rod.

In yet another configuration of the friction coefficient determination apparatus, the sensor for the reaction torque is arranged on the torque rod.

Further advantages and refinements of the invention are obtained from the description and the accompanying drawings.

It goes without saying that the features cited above and those yet to be explained below are usable not only in the respectively indicated combination but also in other combinations or on their own without departing from the scope of the present invention.

BRIEF DESCRIPTION OF THE DRAWING FIGURES

The figures are described coherently and comprehensively; identical components have the same associated reference signs.

DETAILED DESCRIPTION OF THE INVENTION

Figure 1:
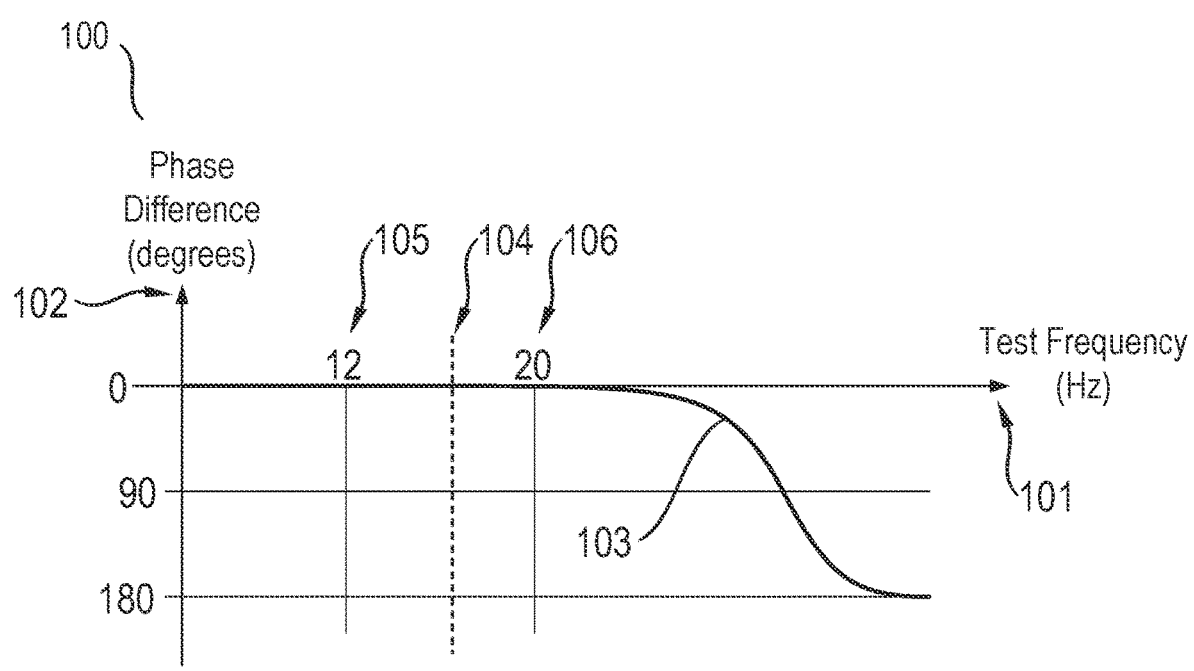
FIG. 1 shows a phase difference characteristic for an embodiment of the method according to aspects of the invention when the test amplitude is smaller.

FIG. 1 shows a phase difference characteristic 100 for an embodiment of the method according to aspects of the invention when the first test amplitude is smaller. An overall system having multiple subsystems, wherein at least two subsystems are connected to one another by an elastic connection, is excited with a vibration at a test frequency, plotted on an abscissa 101 in Hz, during the smaller first test amplitude. For an example of a steering system, an elastic connection may be arranged for example between a torque rod and a steering column with steering wheel, and the excitation may be provided by a vibration generator on the torque rod. A phase of a reaction torque is measured, and this is then used to form a phase difference 103, plotted on an ordinate 102 in degrees, with a phase of the exciting vibration. The test frequency, plotted on the abscissa 101 in Hz, of the vibration is varied from a lower frequency limit at 0 Hz to an upper frequency limit, for example at 40 Hz. The elastic connection is in a static friction state during the vibration at the lower frequency limit. However, the test amplitude should be chosen to be sufficiently large for the elastic connection to be able to be transferred to the sliding friction state between the lower and upper frequency limits. Starting from the lower frequency limit, the test frequency, plotted on the abscissa 101 in Hz, is increased, and this is supposed to take place with a suitable time characteristic, so that no nonlinearities are measured in a system response. The phase difference 103 is 0° while the elastic connection is exclusively in the static friction state.

In the example of a steering system, this is the case at least up to above a test frequency of 12 Hz 105. Only at a test frequency of approximately 20 Hz 106 does a transition region begin to the sliding friction state, which is reached completely when indicated by a value of 180° for the phase difference. As a result, a right-hand upper limit of a frequency range from which the defined excitation frequency 104 is determined is also stipulated.

Figure 2:
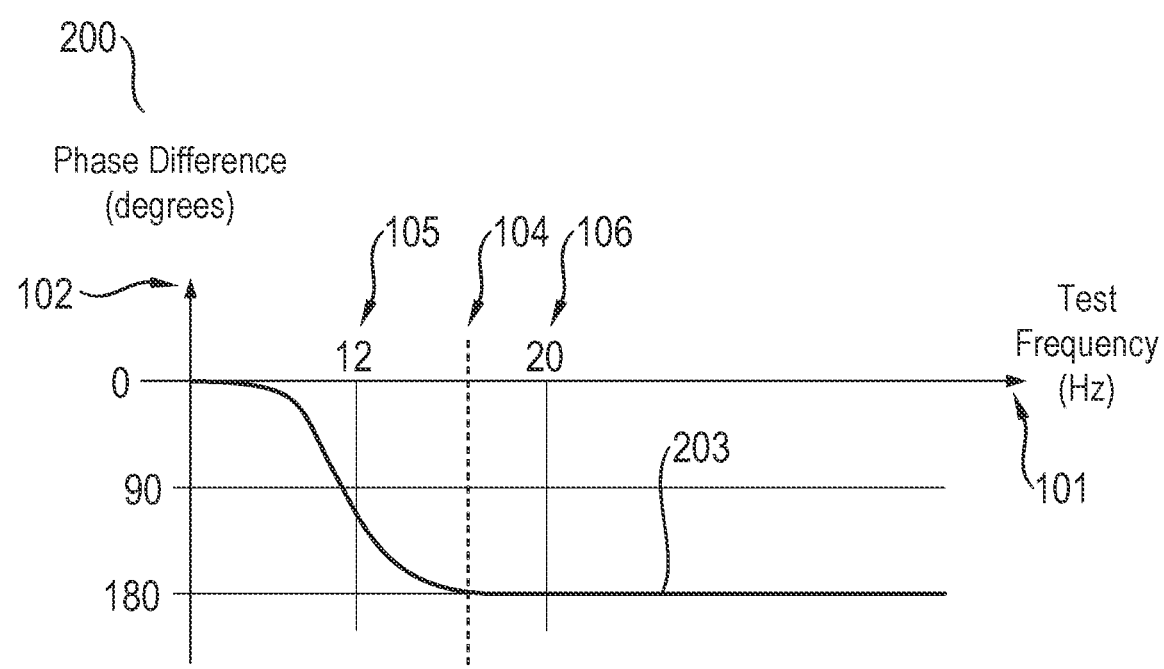
FIG. 2 shows a phase difference characteristic for the embodiment of the method according to aspects of the invention when the test amplitude is larger.

FIG. 2 shows a phase difference characteristic 200 for the embodiment of the method according to aspects of the invention when the test amplitude is larger. In comparison with the smaller first test amplitude selected in FIG. 1, a larger second test amplitude is now set and the variation of the test frequency, plotted on the abscissa 101 in Hz, is repeated. On account of a larger value for the larger second test amplitude, a natural system frequency, which is for example between 9 Hz and 12 Hz for the example of a steering system, falls. The phase difference 203 shown, plotted on the ordinate 102, then begins to leave the value of 0° distinctly before the test frequency 12 Hz 105 and, as a result of reaching the value of 180°, stipulates a left-hand lower limit for the frequency range from which the defined excitation frequency 104 is determined.

Figure 3:
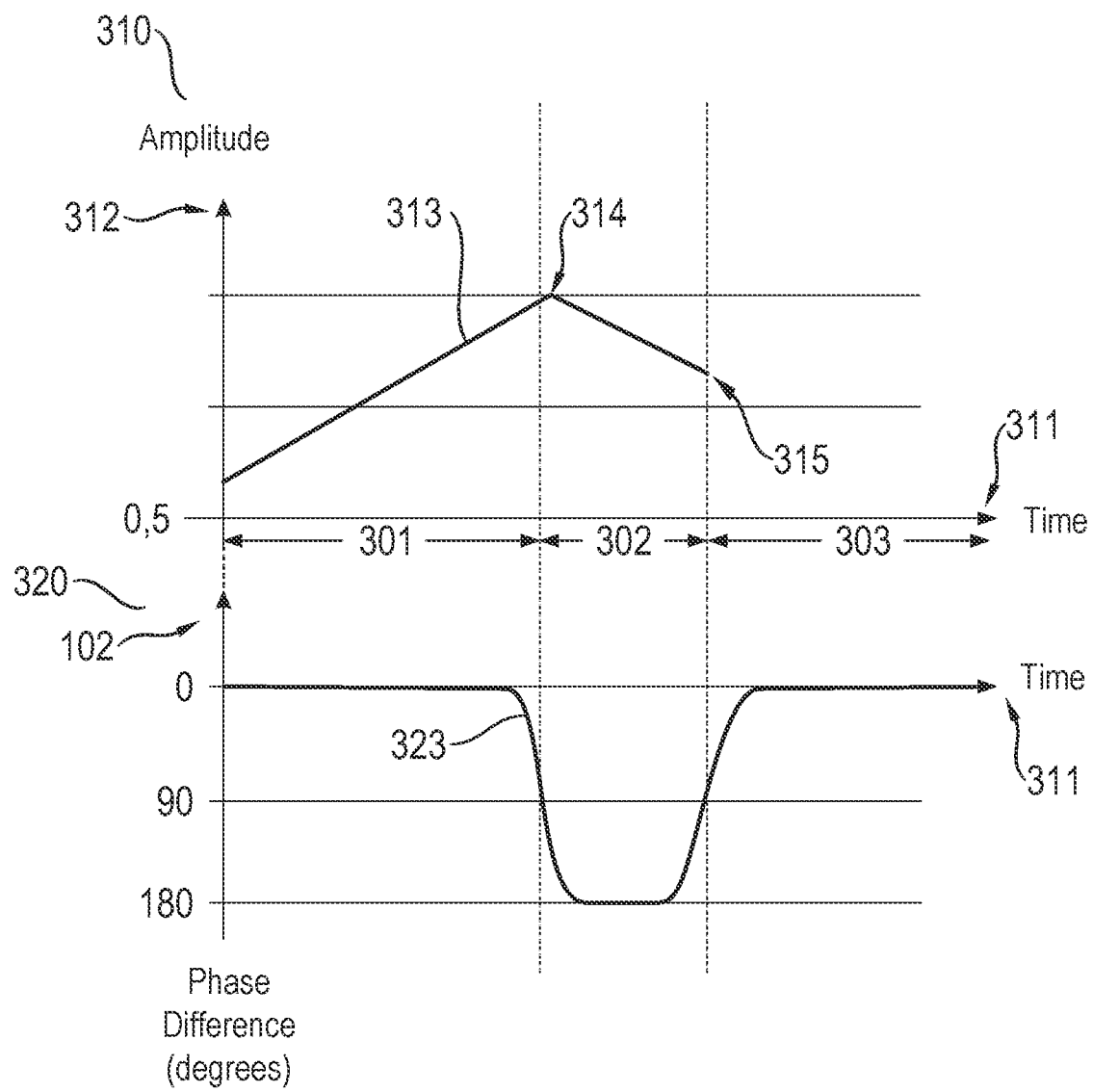
FIG. 3 shows a friction coefficient determination for a further embodiment of the method according to aspects of the invention.

FIG. 3 shows a friction coefficient determination for a further embodiment of the method according to aspects of the invention. After the determination of the defined excitation frequency 104 that is performed in FIG. 1 and FIG. 2, an excitation amplitude value, plotted on an ordinate 312, is then varied for this excitation frequency 104 over a time axis 311 in illustration 310 in accordance with a time characteristic of the excitation amplitude 313. Using the same time axis 311, the accordingly obtained phase difference characteristic 320 is shown underneath. Assuming the elastic connection present in a first static friction state 301, the excitation amplitude 313 is slowly increased from a sufficiently small value and a little larger than 0.5 of a maximum excitation amplitude value reached (at reference sign 314) until the change in the phase difference 323 from 0° to 180°, plotted on the ordinate 102, indicates a transition to the sliding friction state. The excitation amplitude value 314 adopted in the process defines a static friction coefficient 314 or a static friction level 314. As soon as such a phase shift has been detected, the excitation amplitude 313 is lowered again. In the event of the phase difference 323 then conversely changing from 180° to 0°, a static friction state 303 is reached again. An excitation amplitude value 315 at this transition defines a sliding friction coefficient 315 or a sliding friction level 315.

LIST OF REFERENCE SIGNS

100 Phase difference characteristic for smaller test amplitude
101 Test frequency in hertz
102 Phase difference angle in degrees
103 Phase difference
104 Defined excitation frequency
105 Steering-system-typical value in the region of the natural system frequency
106 Beginning of transition region
200 Phase difference characteristic for larger test amplitude
203 Phase difference
301 Static friction state
302 Sliding friction state
303 Static friction state
310 Time characteristic for the excitation amplitude adjustment
311 Time axis
312 Excitation amplitude value
313 Excitation amplitude
314 Static friction coefficient
315 Sliding friction coefficient
320 Phase difference characteristic
323 Phase difference

What is claimed:

1. A method for friction coefficient determination on at least two elastically connected subsystems of an overall system that are connected to one another by an elastic connection, in which the elastic connection has at least one static friction state and a sliding friction state for prescribed external state variables, the method comprising:
   exciting the overall system with a vibration having a variable excitation amplitude at a defined excitation frequency, wherein the excitation amplitude is varied without producing nonlinearities in a system response, in which a phase difference between the vibration and a measured reaction torque together with the excitation amplitude are recorded as a function of time, in which no phase difference occurs in the static friction state and a phase difference of 180° occurs in the sliding friction state,
   wherein in a first step, beginning with a value of the excitation amplitude at which the elastic connection is still in a static friction state, the method further comprises increasing the excitation amplitude until a transition in the phase difference from 0° to 180° indicates the transition from the static friction state to the sliding friction state, wherein the excitation amplitude present for the transition stipulates a static friction coefficient, wherein in a second step, the method further comprises reducing the excitation amplitude until a transition in the phase difference from 180° to 0° indicates the transition from the sliding friction state to the static friction state, wherein the excitation amplitude present for this transition stipulates a sliding friction coefficient.

2. The method as claimed in claim 1, in which the defined excitation frequency is determined by virtue of the overall system being excited with a vibration having a smaller first test amplitude and a larger second test amplitude, in which a test frequency of the vibration is varied from a lower frequency limit to an upper frequency limit, in which the elastic connection is still in a static friction state for all prescribed external state variables during the vibration at the lower frequency limit, in which the elastic connection is in a sliding friction state for all prescribed external state variables during the vibration of the upper frequency limit, in which in a first test step, the vibration has the smaller first test amplitude, which is sufficiently large to transfer the elastic connection to the sliding friction state between the lower and upper frequency limits, wherein a transition between the static friction state and the sliding friction state is effected in a first transition region around a first natural system frequency, in which in a second test step, the vibration has the larger second test amplitude, wherein the transition between the static friction state and the sliding friction state is effected in a second transition region around a second natural system frequency, wherein the first test amplitude and the second test amplitude are chosen such that the two transition regions do not overlap, and wherein the defined excitation frequency is chosen from a frequency range between the two transition regions.

3. The method as claimed in claim 1, in which the external state variables are selected from a group consisting of temperature, age, wear, or service interval.

4. The method as claimed in claim 1, in which the overall system is formed from the subsystems steering wheel, steering column and torque rod.

5. The method as claimed in claim 4, in which the overall system in direct proximity to the steering wheel and the steering column is excited by the vibration.

6. The method as claimed in claim 4, in which the reaction torque on the torque rod is measured by a sensor.

7. A friction coefficient determination apparatus for friction coefficient determination on at least two elastically connected subsystems of an overall system that are connected to one another by an elastic connection, said apparatus comprising:
a vibration generator configured to excite the subsystems with a vibration,
a sensor for detecting a reaction torque for the overall system,
a recorder for recording a phase difference between the vibration and the detected reaction torque together with an excitation amplitude as a function of time, and
wherein the apparatus is configured so as, in a first step, beginning with a value of the excitation amplitude at which the elastic connection is still in a static friction state, to increase the excitation amplitude until a transition in the phase difference from 0° to 180° indicates a transition from the static friction state to the sliding friction state, wherein the excitation amplitude present for this transition stipulates a static friction coefficient, and,
wherein in a second step, the apparatus is configured to reduce the excitation amplitude until a transition in the phase difference from 180° to 0° indicates the transition from the sliding friction state to the static friction state, wherein the excitation amplitude present for this transition stipulates a sliding friction coefficient.

8. The friction coefficient determination apparatus as claimed in claim 7 wherein the recorder is further configured for recording the phase difference as a function of a test frequency, and wherein the apparatus is configured to determine a defined excitation frequency by virtue of the overall system being excited with a vibration having a smaller first test amplitude and a larger second test amplitude, and a test frequency of the vibration being varied from a lower frequency limit to an upper frequency limit, wherein the elastic connection is still in a static friction state for all prescribed external state variables during a vibration at the lower frequency limit and wherein the elastic connection is in a sliding friction state for all prescribed external state variables during a vibration at the upper frequency limit, and by virtue of, in a first test step, a vibration with the smaller first test amplitude, which is sufficiently large to transfer the elastic connection to the sliding friction state between the lower and upper frequency limits, being used to produce a transition between the static friction state and the sliding friction state in a first transition region around a first natural system frequency, and, in a second test step, a vibration with the larger second test amplitude being used to produce a transition between the static friction state and the sliding friction state in a second transition region around a second natural system frequency, wherein the first test amplitude and the second test amplitude are chosen such that the two transition regions do not overlap, and by virtue of the defined excitation frequency being in a frequency range between the two transition regions.

9. The friction coefficient determination apparatus as claimed in claim 7, in which the overall system is formed from the subsystems steering wheel, steering column and torque rod.

10. The friction coefficient determination apparatus as claimed in claim 9, in which the sensor for detecting the reaction torque is arranged on the torque rod.

11. The method of claim 1, wherein based on the second step, the method further comprises the step of adjusting a power steering setting of the vehicle.

12. The method of claim 1, wherein based on the second step, the method further comprises the step of adjusting either (i) a power steering setting of the vehicle or (ii) a driver assistance function of the vehicle.

* * * * *